United States Patent [19]
Eith et al.

[11] Patent Number: 5,730,509
[45] Date of Patent: Mar. 24, 1998

[54] MAGNETIC CONTROL VALVE FOR A SLIP-CONTROLLED HYDRAULIC BRAKE SYSTEM FOR MOTOR VEHICLES

[75] Inventors: Hubert Eith; Helmut Staib, both of Schwieberdingen; Michael Friedow, Tamm; Juergen Lander, Stuttgart; Gerhard Stokmaier, Markgroeningen, all of Germany

[73] Assignee: Robert Bosch GmbH, Stuttgart, Germany

[21] Appl. No.: 704,002

[22] Filed: Aug. 22, 1996

[30] Foreign Application Priority Data

Aug. 23, 1995 [DE] Germany ............... 195 31 009.8

[51] Int. Cl.⁶ ..................................... B60T 8/32
[52] U.S. Cl. ............... 303/119.2; 251/129.14; 303/113.1
[58] Field of Search .............. 303/119.2, 119.1, 303/900, 901, 113.1, 116.1, 116.2, 113.2; 251/337, 335.2, 129.14, 129.15, 129.17, 129.21, 129.22

[56] References Cited

U.S. PATENT DOCUMENTS

| 3,740,019 | 6/1973 | Kessell et al. | 251/129.17 |
|---|---|---|---|
| 4,585,176 | 4/1986 | Kubach et al. | 251/129.17 |
| 4,674,540 | 6/1987 | Takei et al. | 251/337 |
| 4,756,331 | 7/1988 | Stegmaier | 251/129.14 |
| 4,765,693 | 8/1988 | Stegmaier | 303/119.2 |
| 4,790,351 | 12/1988 | Kervagonet | 303/119.2 |
| 4,830,286 | 5/1989 | Asslaender et al. | 251/129.17 |
| 4,944,331 | 7/1990 | Tackett | 303/119.2 |
| 4,946,107 | 8/1990 | Hunt | 251/129.21 |
| 5,167,442 | 12/1992 | Haze et al. | 303/119.2 |
| 5,267,785 | 12/1993 | Maisch | 303/901 |
| 5,425,575 | 6/1995 | Schmidt et al. | 303/119.2 |
| 5,439,279 | 8/1995 | Linkner, Jr, et al. | 303/119.2 |
| 5,445,448 | 8/1995 | Wolff et al. | 303/901 |
| 5,577,322 | 11/1996 | Ohshita et al. | 303/119.2 |
| 5,605,386 | 2/1997 | Ziegler et al. | 303/119.2 |
| 5,617,896 | 4/1997 | Wolff | 251/129.14 |

FOREIGN PATENT DOCUMENTS

| 0524440 | 1/1993 | European Pat. Off. | 303/119.1 |
|---|---|---|---|
| 2361398 | 3/1975 | Germany. | |
| 3542131 | 5/1986 | Germany | 303/119.2 |
| 4312414 | 10/1994 | Germany | 303/119.2 |
| 1-145482 | 6/1989 | Japan | 251/129.16 |

*Primary Examiner*—Douglas C. Butler
*Attorney, Agent, or Firm*—Edwin E. Greigg; Ronald E. Greigg

[57] ABSTRACT

A magnetic valve that furnishes a large flow cross section and switches at high differential pressures. The magnetic valve has an armature, which when current is supplied to a coil is movable toward a pole core counter to the force of a first restoring spring. Guided on the armature is a valve closing member, movable longitudinally relative to the armature, of a seat valve. Also supported in the armature is a second restoring spring, which exerts a force acting in the direction of the pole core upon the valve closing member. The magnetic valve is especially suitable for slip-controlled hydraulic brake systems of motor vehicles.

7 Claims, 2 Drawing Sheets

MAGNETIC CONTROL VALVE FOR A SLIP-CONTROLLED HYDRAULIC BRAKE SYSTEM FOR MOTOR VEHICLES

BACKGROUND OF THE INVENTION

The invention is based on a magnetic valve for a slip-controlled hydraulic brake system for motor vehicles.

A magnetic valve of this type is already known (DE 236 13 98 B1), in which the second restoring spring is embodied as a helical compression spring. The prestressed second restoring spring is located in a bore of the armature in which the boltlike valve closing member is also received in a longitudinally movable way. With one end, the restoring spring engages an annular disk that is secured in the bore to the end portion of the armature remote from the pole core. The other end of the restoring spring engages a collar of the valve closing member, which is supported on the armature toward the pole core by the collar. Upon switchover of the known magnetic valve to the open position, the armature executes a relative motion with respect to the valve closing member, if the valve closing member is urged by a hydraulic closing force that exceeds the prestressing force of the second restoring spring. In the open position of the magnetic valve, the valve closing member, because of the action of the restoring spring, assumes its original position relative to the armature, so that the seat valve of the magnetic valve makes its maximum flow cross section available.

The known magnetic valve has the disadvantage that for receiving the second restoring spring, it requires a relatively deep bore in the armature. This increases the production cost of the valve.

OBJECT AND SUMMARY OF THE INVENTION

The magnetic valve of the invention has the advantage over the prior art that a washerlike spring requires considerably less installation space than a helical spring.

Advantageous further features of and improvements to the magnetic valve are possible with the provisions recited herein.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
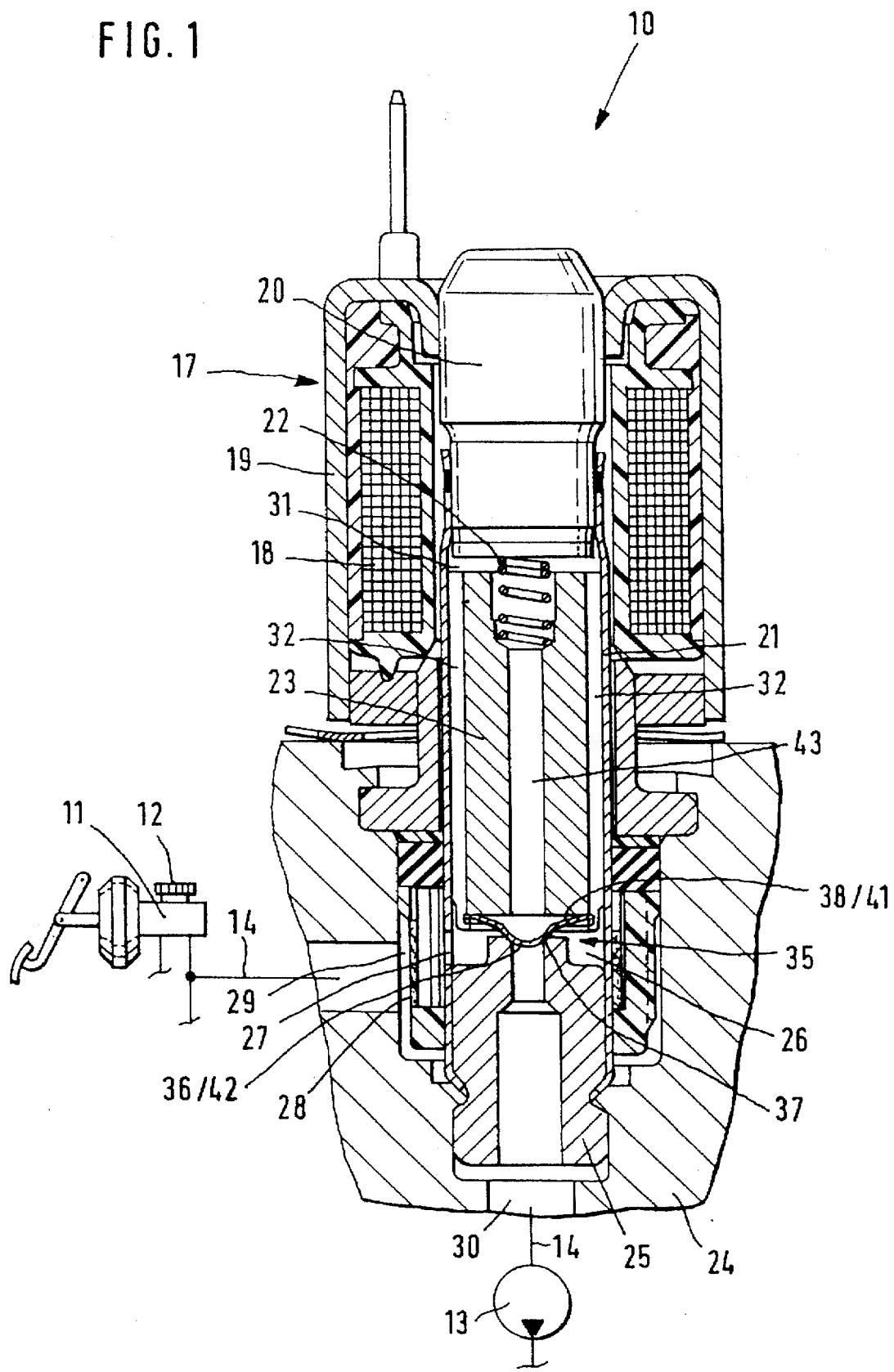
FIG. 1 is a longitudinal section of a magnetic valve, having a valve closing member, movable relative to an armature, as an integral part of a washerlike spring.

The first exemplary embodiment shown in FIG. 1 shows a magnetic valve 10 for use in a slip controlled hydraulic brake system for motor vehicles, of which in the drawing only a master cylinder 11 with a supply tank 12 for pressure fluid and a high-pressure pump 13 are shown for supplying pressure fluid to the magnetic valve and to the brake system, not shown. One such brake system is shown in German Patent Application DE 44 41 791 A1, which was not published prior to the priority date of the present application. It is designed not only for anti-lock braking but also for traction control, as well as for automatic braking for the sake of lateral-slip control (drive dynamics control) and to reinforce driver-actuated braking (brake assistant). It is therefore an essential demand of the magnetic valve 10 of the invention, which is located in an intake line 14 extending between the master cylinder 11 and the pump 13, is to open even counter to a brake pressure generated by the master cylinder 11 and to uncover a relatively large flow cross section, so that the pump 13 can pump an adequately large volumetric stream, even at low temperatures, in particular to the brake system.

The magnetic valve 10 has an electromagnet 17, which substantially comprises a coil 18, a housing jacket 19, and a pole core 20. The pole core 20 is tightly welded to a guide sleeve 21 for an armature 23 that is longitudinally movable toward the pole core counter to the force of a prestressed restoring spring. On its other end, the guide sleeve 21 that engages a valve block 24 is tightly joined to a valve body 25. Between the armature 23 and the valve body 25, a first valve chamber 26 is formed in the guide sleeve 21; through both an opening 27 in the guide sleeve and a filter 28, this valve chamber communicates unthrottled with the inflow side 29 of the magnetic valve 10. The aforementioned intake line 14 leads from the inflow side 29 to the master cylinder 11. The outflow side 30 of the magnetic valve 10 is located on the outlet side of the valve body 25, which has a longitudinal hole drilled through it. The outflow side 30 communicates through the intake line 14 with the intake side of the pump 13. In addition to the first valve chamber 26, the magnetic valve 10 has a second valve chamber 31, formed between the pole core 20 and the armature 23, which determines the working air gap of the magnetic valve. The two valve chambers 26 and 31 communicate with one another through longitudinal passages 32 of the armature 23. The armature 23 is accordingly bathed by pressure fluid.

The magnetic valve 10 switches the passage between the inflow side 29 and the outflow side 30 with a seat valve 35. This valve is formed by a valve closing member 36 joined to the armature 23 and by a stationary valve seat 37 on the valve body 25. As a result of the disposition of a second restoring spring 38 between the armature 23 and the valve closing member 36, the valve closing member is movable relative to the armature in the direction of its longitudinal axis. To this extent, this embodiment matches the embodiment of the magnetic valve of the exemplary embodiments that follow hereinafter.

In the exemplary embodiment of FIG. 1, the second restoring spring 38 comprises a washerlike diaphragm spring 41, which is crimped on its edge into the armature 23. To vary the spring force and spring travel, the diaphragm spring 41 may have slits that extend radially or in some other direction. In its central zone, the diaphragm spring 41 changes into a approximately hemispherical bulge 42 protruding toward the valve body 25. This bulge 42 forms the valve closing member 36, which is thus an integral component of the second restoring spring 38. The valve seat 37 of the seat valve 35 is adapted to the bulge 42 and is hollow-conical in form. While the protruding side of the valve closing member 36 faces toward the first valve chamber 26, a longitudinal bore 43 of the armature 23 leads on the back side of the valve closing member into the second valve chamber 31, through the longitudinal bore 43, the second valve chamber 31 and the longitudinal grooves 32 of the armature 23, the valve closing member 36 communicates on both sides with the first chamber 26. Accordingly, it is loaded on both sides with the pressure prevailing in the first chamber 26.

The mode of operation of the magnetic valve 10 is as follows:

Supplying current to the coil 18 switches the magnetic valve 10 over from the blocking position, shown, into the open position, in which the inflow side 29 communicates with the outflow side 30 through the opened main valve 35. The magnetic force exerted on the armature 23 upon the switchover is at its lowest value at the beginning of the armature stroke. Once the working air gap has been overcome, or in other words, once the armature 23 engages the pole core 20, the magnetic force attains its highest value.

The armature 23 is urged by the prestressing force of the first restoring spring 22 toward the valve body 25. The magnetic force must therefore move the armature 23 toward the pole core 20, overcoming the prestressing force of the first restoring spring 22. In the blocking position of the magnetic valve 10, the prestressing force of the first restoring spring 22 effects a force of reaction of the second restoring spring 38 upon the armature 23, or in other words that acts in the direction of the pole core 20. If the armature weight is not taken into account, this force of reaction is equivalent to the prestressing force of the first restoring spring. In an especially advantageous way, the second restoring spring 38 reinforces the magnetic force during a portion of the working stroke of the armature. As the working stroke of the armature increases, however, the first reaction is reduced to zero once the second restoring spring 38 assumes its form in which it is not loaded by any forces.

When there is a pressure equilibrium on the inflow side 29 and the outflow side 30 of the magnetic valve, no hydraulic closing forces are operative upon the armature 23 and the valve closing member 36. In order to open the seat valve 35 all the way, the magnetic force, initially reinforced by the force of reaction of the second restoring spring 38, therefore needs to overcome only the prestressing force of the restoring spring 22.

Conversely, if a higher pressure prevails on the inflow side 29 than on the outflow side 30 when the magnetic valve 10 is closed, or in other words as a result of actuation of the master cylinder 11, then the pressure-fluid-bathed armature 23 is pressure-equalized, but conversely the valve closing member 36 is loaded by a hydraulic closing force that depends on the relatively large sealing diameter of the seat valve 35 and on the magnitude of the pressure difference. This closing force seeks to keep the valve closing member 36 against the valve seat 37, while the armature 23 is moved toward the pole core 20 by the magnetic force. In the process, the second restoring spring 38 undergoes a deflection in such a way that the armature 23 moves away from the valve closing member 36. If the magnitude of the magnetic force, minus the force of the first restoring spring 22, exceeds the hydraulic closing force loading the valve closing member 36, then the valve closing member is lifted from the valve seat 37. Because of the pressure fluid flowing from the inflow side 29 to the outflow side 30 of the magnetic valve 10, the pressure difference at the seat valve 35 begins to decrease. While the armature 23 is moved toward the pole core 20, the second restoring spring 38 returns to its force-free position, toward the armature 23. When the armature 23 strikes the pole core 20, the seat valve 35 assumes its maximum possible flow cross section.

In the ensuing description of the second exemplary embodiment, only differences in the exemplary embodiment already described will be mentioned. If characteristics shown in the drawing are not mentioned below, then they are the same as the characteristics of the preceding exemplary embodiments.

Figure 2:
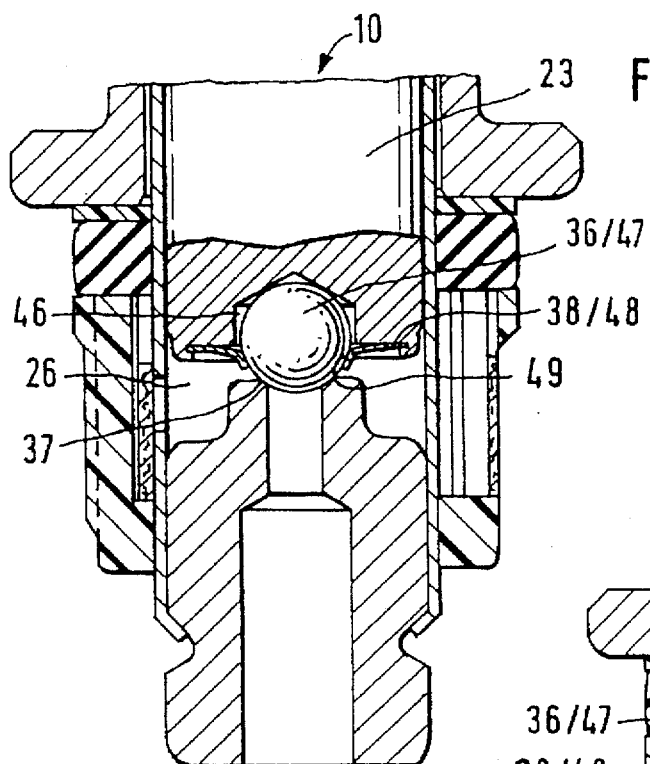
FIGS. 2, 3 and 4 show variants of the valve closing member and of the spring.

The exemplary embodiment shown in FIG. 2 differs from the preceding one essentially in that the armature 23, remote from the pole core, has a blind bore 46 that receive a ball 47 as the valve closing member 36, which is retained in the bore by a separate diaphragm spring 48 acting as the second restoring spring 38. The diaphragm spring 48 has a central recess 49 as a bearing seat for the ball 47, which reaching partway through the central recess 49 supported on both the armature 23 and the valve seat 37 in the blocking position of the magnetic valve 10. The diaphragm spring 48 is mounted with prestressing; that is, it exerts a force upon the ball 47 that acts in the direction of the armature 23. The diaphragm spring 48 may have slits, not shown, for connecting the bore 46 of the armature 23 with the first valve chamber 26 in a pressure-fluid-carrying way, or else the armature may be pierced by a longitudinal bore as in the first exemplary embodiment.

If there is pressure equilibrium between the inflow side 29 and the outflow side 30 of the magnetic valve 10, the armature 23 and the valve closing member 36 are pressure-equalized. For switching the magnetic valve 10 over to the open position from the blocking position, the magnetic force need merely overcome the force of the first restoring spring 22.

When the pressure on the inflow side 29 is higher than on the outflow side 30 of the magnetic valve 10, the armature 23 is pressure-equalized, while the valve closing member 36 is subjected to the hydraulic closing force. During the armature motion toward the pole core 20, the ball 47 initially remains on the valve seat 37. The diaphragm spring 48 undergoes a deflection and major prestressing in the process. If the spring force exerted by the diaphragm spring 48 upon the ball 47 in the direction of the armature 23 exceeds the hydraulic closing force, the ball 47 is lifted from the valve seat 37. The diaphragm spring 48 guides the ball 47 back into the bore 46 until it strikes the armature 23, while the magnetic force moves the armature until it strikes the pole core 20. The seat valve 35 assumes its maximum possible flow cross section.

Figure 3:
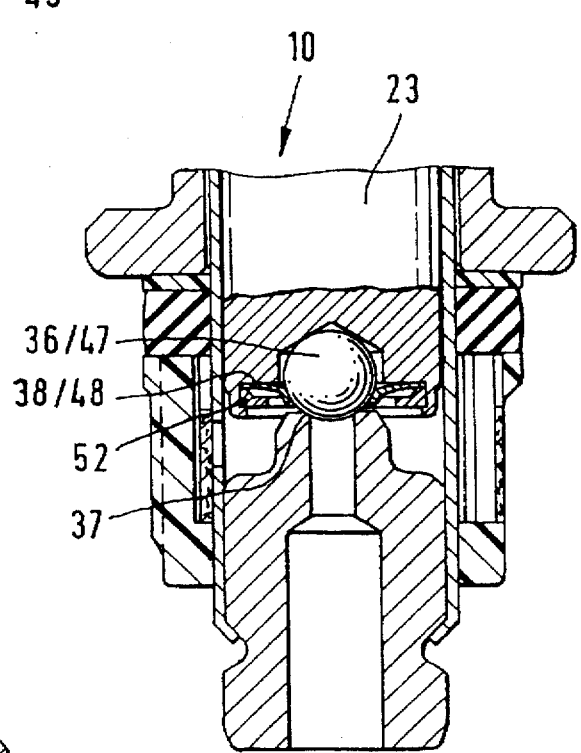

The exemplary embodiment of FIG. 3 differs from that of FIG. 2 in that the diaphragm spring 48 is crimped into the armature 23 with the interposition of a support ring 52. The support ring 52 is located on the side remote from the pole core of the diaphragm spring 48. It limits the deflection of the diaphragm Spring 48 during the working stroke of the armature. This reinforces the lifting the ball 47 from the valve seat 37 if some of the energy of motion of the armature 23 is suddenly transferred to the ball upon the impact of the diaphragm spring 48 with the support ring 52. Otherwise, the function of the magnetic valve 10 is the same as in the exemplary embodiment of FIG. 2.

Figure 4:
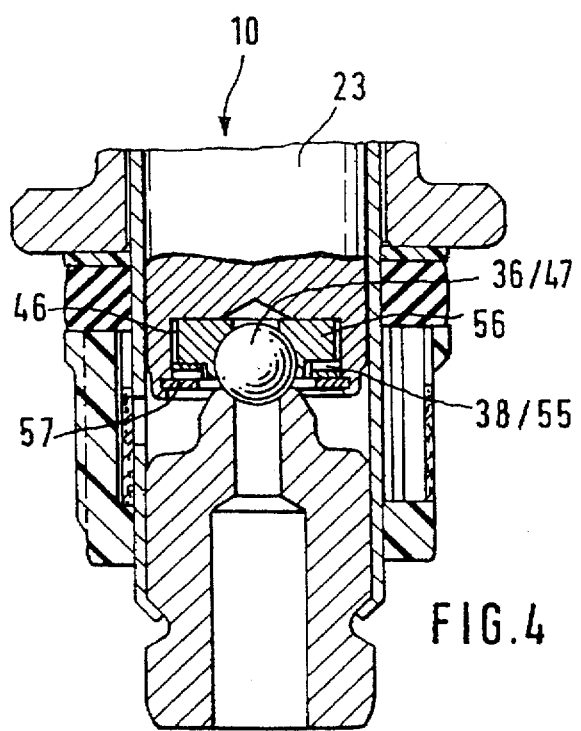

For the exemplary embodiment of FIG. 4, a washerlike spring in the form of a wave washer 55 as the second restoring spring 38 is definitive. The wave washer 55 is located together with a cylindrical guide body 56 in the bore 46 of the armature 23. The bore 46 is closed peripherally, remote from the pole core, with a crimped-in retaining ring 57. The wave washer 55 engages the retaining ring 57 on one side and the guide body 56 on the other, with initial tension. As the valve closing member 36, a ball 47 is caulked in to the guide body 56. The wave washer 55 generates a force that returns the guide body 56 and ball 47 into the bore 46 of the armature 23, while upon the working stroke of the armature the retaining ring 57 limits the relative motion of the guide body and ball with respect to the armature 23. The mode of operation of this embodiment is the same as that of FIG. 3.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A magnetic control valve (10), for disposition in an intake brake line (14), said control valve extends between a master cylinder (11) and an intake side of a pump (13), of a slip-controlled hydraulic brake system for motor vehicles, comprising:

an armature (23) that is longitudinally movable by an electromagnet (17) counter to a force of a first restoring spring (22) having one end that engages one end of a pole core (20), and another end that engages the armature (23);

a valve closing member (36) that is longitudinally movable relative to the armature (23) and cooperates with a stationary valve seat (37) of a seat valve (35) is guided on the armature (23), remote from the pole core;

the valve closing member (36) is located in a chamber (26) that communicates with an inflow side (29) of the magnetic valve (10);

a second restoring spring (38) is secured to the armature on a face end of the armature (23) remote from the pole core and exerts a force acting in a direction of the pole core (20) upon the valve closing member (36);

the valve closing member (36) is lifted from the valve seat (37) by the armature (23) with reinforcement from the second restoring spring (38) when the electromagnet (17) is excited; and the second restoring spring (38) is a washerlike spring.

2. A magnetic valve in accordance with claim 1, in which the second restoring spring is a diaphragm spring (41), with an approximately hemispherical bulge (42) in a central zone that cooperates with the valve seat (37).

3. A magnetic valve in accordance with claim 2, in which the diaphragm spring (41, 48) is crimped peripherally into the armature (23) or is retained by a support ring (52) that is crimped into the armature (23) and limits deflection of the diaphragm spring.

4. A magnetic valve in accordance with claim 1, in which the second restoring spring is a diaphragm spring (48) with a central recess (49) which forms a bearing seat for a ball (47) that is received on the face end of the armature (23) and cooperates with the valve seat (37).

5. A magnetic valve in accordance with claim 4, in which the diaphragm spring (41, 48) is crimped peripherally into the armature (23) or is retained by a support ring (52) that is crimped into the armature (23) and limits a deflection of the diaphragm spring.

6. A magnetic valve in accordance with claim 1, in which the second restoring spring is a wave washer (55) disposed between the valve closing member (38) and a retaining ring (57) that is peripherally crimped into the armature (23).

7. A magnetic valve in accordance with claim 1, in which a conduit (32) is provided on a jacket side of the armature (23), said conduit is connected to the chamber (26) and to a chamber (31) toward the pole core of the armature (23), from which chamber (31) a longitudinal bore (43) of the armature (23) leads to the valve closing member (36).

* * * * *